United States Patent [19]

Busch et al.

[11] Patent Number: 5,611,600
[45] Date of Patent: Mar. 18, 1997

[54] CATCH HOOK FOR THE RELEASABLE LOCKING OF THE BACKREST CONNECTED WITH THE SEAT PART OF A VEHICLE SEAT SUCH THAT THE BACKREST CAN SWIVEL FORWARD

[75] Inventors: Hans-Walter Busch, Hilden; Joerg Nalbach, Remscheid, both of Germany

[73] Assignee: Keiper Recaro GmbH & Co., Remscheid, Germany

[21] Appl. No.: 438,070

[22] Filed: May 8, 1995

[30] Foreign Application Priority Data

May 19, 1994 [DE] Germany .................. 44 17 491.8

[51] Int. Cl.⁶ .................................................... B60N 2/08
[52] U.S. Cl. ............................................................ 297/378.12
[58] Field of Search ........................ 297/378.12, 378.11, 297/380

[56] References Cited

FOREIGN PATENT DOCUMENTS

| | | |
|---|---|---|
| 0209660 | 1/1987 | European Pat. Off. . |
| 0288455 | 7/1987 | European Pat. Off. . |
| 0269348 | 6/1988 | European Pat. Off. . |
| 3813594A1 | 11/1989 | Germany . |
| 87/01361 | 3/1987 | WIPO . |

*Primary Examiner*—Peter R. Brown
*Assistant Examiner*—Stephen Vu
*Attorney, Agent, or Firm*—McAulay Fisher Nissen Goldberg & Kiel, LLP

[57] ABSTRACT

A catch hook for the releasable locking of the backrest connected with the seat part of a vehicle seat such that the backrest can swivel forward. The catch hook is supported in a swivelably articulated manner at the articulated part of an articulated fitting which possibly comprises an adjusting and locking arrangement for adjusting the inclination of the backrest, this articulated part being connected with the seat part so as to be swivelable. The hook jaw of the catch hook engages around a stop for the articulated part in the locking position, this stop being fixed to the seat part. The locking position is secured in a releasable manner by a retaining lever which acts on the catch hook and is supported at the articulated part so as to be swivelable. In order to minimize the structural component parts required for the catch hook arrangement, the catch hook has a control cam forming the upper side of the hook jaw and projecting beyond the hook finger. The catch hook is connected with the retaining lever by a force accumulator which acts on the latter so as to press them against one another. An operable releasing member is articulated at the retaining lever.

10 Claims, 3 Drawing Sheets

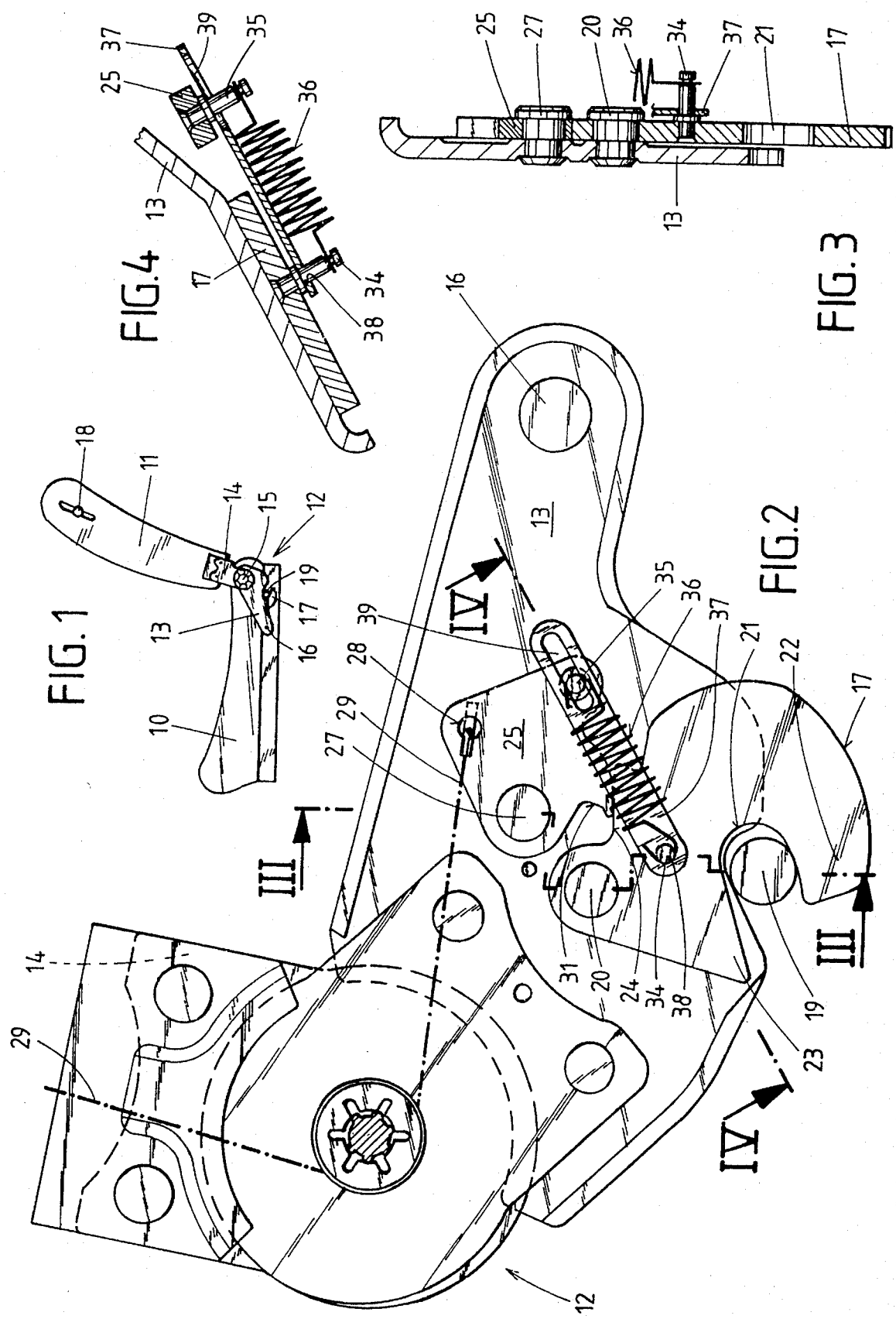

CATCH HOOK FOR THE RELEASABLE LOCKING OF THE BACKREST CONNECTED WITH THE SEAT PART OF A VEHICLE SEAT SUCH THAT THE BACKREST CAN SWIVEL FORWARD

BACKGROUND OF THE INVENTION

1. Field of the Invention

The invention is directed to a catch hook for the releasable locking of the backrest connected with the seat part of a vehicle seat such that it can swivel forward, which catch hook is supported in a swivelably articulated manner at the articulated part of an articulated fitting which possibly comprises an adjusting and locking arrangement for adjusting the inclination of the backrest. This articulated part is connected with the seat part so as to be swivelable. The hook opening or jaw of the catch hook engages around a stop for the articulated part in the locking position. This stop is fixed to the seat part. The locking position is secured in a releasable manner by a retaining lever which acts on the catch hook and is supported at the articulated part so as to be swivelable.

2. Description of the Related Art

In order to swivel forward the backrest of front seats in a passenger automobile, particularly in a two-door passenger automobile, to facilitate entry to the rear passenger compartment, it is proposed, e.g., in DE 25 14 819 A1, that the articulated part of an articulated fitting serving to adjust the inclination of the backrest be supported in a swivelable manner at the seat part with which the articulated part is associated. Irrespective of the adjusting possibility afforded by such articulated fittings, these articulated fittings act as units which are connected with the backrest in a rigid and stationary manner for swiveling the backrest forward. In the use position, the backrest is supported relative to the normally occurring forces directed toward the rear by frictional engagement against a stop or stops which is/are stationary with respect to the seat part. In order to prevent the backrest from swiveling forward suddenly in the event of sharp braking or collision, catch hooks are provided at the articulated part associated with the seat part, these catch hooks engaging behind stops which are stationary with respect to the seat part so as to secure the backrest in the use position. If required, the catch hooks may be disengaged from their engaged position so that the backrest can be swiveled forward. For this purpose, handles are generally arranged in the upper side regions of the backrest for convenient operation, these handles being connected with the catch hooks via Bowden cables. In the solution proposed in DE 25 14 819 A1, the catch hook which is supported at the articulated part associated with the seat part is in a working connection with a retaining cam which is also arranged at this articulated part in a swivelable manner. A driver acted upon by a Bowden cable is coupled with the retaining cam so as to be fixed with respect to rotation relative to it, the driver and retaining cam being swiveled via the Bowden cable in such a way that the catch hook can also be disengaged from its engaged position. In addition to the retaining cam and driver, the known solution also makes use of a hold-back device which is connected, via an elongated hole, with the articulated part which is stationary with respect to the seat part and, via a radial cam, with the catch hook so that the catch hook can be held in its open position until the backrest is returned from its folded-forward position into its use position. The hold-back device and driver are supported via separate force accumulators at the articulated part which is stationary with respect to the seat part. While the retaining cam serves to lock the catch hook in its blocking position, the hold-back device serves to hold the catch hook in its open position during the phase of swiveling the backrest backward and forward. In order to enable the articulated part associated with the seat part to be supported at the stop in the locking phase without play and without dependence on tolerances, the region of the hook jaw engaging behind the stop has an ascending clamping face which also compensates for wear which may occur, especially in view of the fact that the retaining cam has an ascending contact-pressing surface. Although this known solution functions satisfactorily, it suffers in particular from the disadvantage of a multitude of structural component parts. This results in substantial manufacturing and assembly costs. Even so, its functioning is only ensured so long as the restoring springs for the hold-back device, retaining cam and driver remain operational.

OBJECT AND SUMMARY OF THE INVENTION

The primary object of the present invention is to improve a catch hook of the type mentioned above in such a way that the number of structural component parts can be decisively reduced while maintaining a locking position without play and while securing the open position of the catch hook during the phase of swiveling the backrest forward and backward.

This object is met according to the invention in that the catch hook has a control thumb or cam forming the upper side of the hook jaw and projecting beyond the hook finger and the catch hook is connected with the retaining lever by a force accumulator which acts on the latter so as to press them against one another, wherein an operable releasing member is articulated at the retaining lever. This solution accordingly limits the locking device practically to two structural component parts, namely the catch hook itself and the retaining lever which is in a working connection therewith, these structural component parts being connected by a force accumulator. The retaining lever serves to maintain the locking position of the catch hook as well as its open position, this latter-possibility being afforded in that the side of the catch hook located opposite the hook jaw for contacting the retaining lever has a back-step, a projection of the retaining lever engaging behind the back-step in the open position of the catch hook. The corner region of the back-step adjoining the back of the hook has a groove in which a protuberance arranged at the tip of the projection at the retaining lever engages to secure the open position of the catch hook.

However, in order to ensure the locking function and enable disengagement in the event of malfunction of the force accumulator connecting the retaining lever and catch hook, the retaining lever and the catch hook are connected with one another, according to a further feature of the invention, by means of a safety coupling associated with the force accumulator.

An axle pin advantageously projects from a side of the catch hook for the working connection of the catch hook and retaining lever, this axle pin being acted upon by one end of the force accumulator which is constructed as a tension spring, while the other end of the force accumulator acts on an axle pin emerging from a side of the retaining lever, wherein the axle pins also serve to receive the safety coupling. The safety coupling advantageously has a bearing bore hole for receiving one axle pin, while the other axle pin is engaged by an elongated hole of the safety coupling.

The invention is shown in an embodiment example in the drawing and is explained more fully in the following.

BRIEF DESCRIPTION OF THE DRAWINGS

In the drawings:

FIG. 1 shows a side view of a front seat of a motor vehicle in its use position;

FIG. 2 is an enlarged view showing the catch hook arrangement in its working position at the inside of the articulated part of the articulated fitting, which articulated part is associated with the seat part;

FIG. 3 shows the catch hook arrangement supported at the articulated part in section according to line III—III of FIG. 2;

FIG. 4 shows the connection position between the catch hook and retaining lever with force accumulator and safety coupling in section according to line IV—IV of FIG. 2;

DESCRIPTION OF THE PREFERRED EMBODIMENTS

Figure 6:
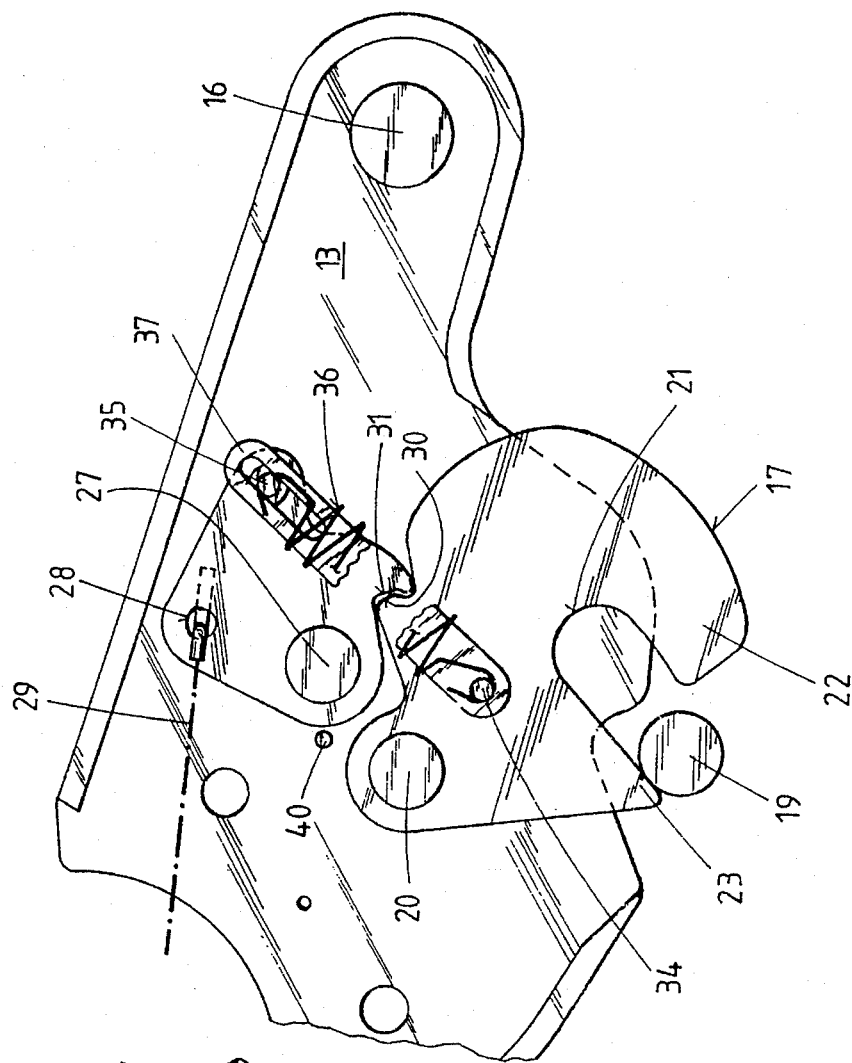
FIG. 6 shows the catch hook arrangement in a position in which the retaining lever holds the catch hook in its open position in a view analogous to FIGS. 2 and 5.

The front seat of a passenger automobile shown in FIG. 1 has a seat part 10 and a backrest 11. An articulated fitting 12 having an articulated part 13 which can be connected with the seat part 10 and an articulated part 14 which can be connected with the backrest 11 is located on each longitudinal side of the seat between the seat part 10 and the backrest 11. The articulated part 14 which is swivelable relative to articulated part 13 can be actuated to adjust the inclination of the backrest 11 via a handle 15 which is constructed, for instance, as a turning knob. In the adjusting position, the articulated fitting forms an inherently rigid unit which can be swiveled forward together with the backrest 11 about a pin 16 which is stationary with respect to the seat part so as to improve access to the rear passenger compartment of a motor vehicle. The articulated part 13 associated with the seat part 10 is outfitted with a catch hook arrangement which is not shown in FIG. 1. A handle 18 which is coupled with the catch hook arrangement via Bowden cables or the like is arranged in the upper side region of the backrest for disengaging the catch hook 17 so that the backrest 11 may be swiveled forward.

As can be seen from FIGS. 1, 2, 6 and 7, the articulated part 13 associated with the seat part is swivelable about a pin 16 which is stationary with respect to the seat part. In the use position, the lower edge of the articulated part 13 contacts a stop 19 which can be formed, for example, by tubing traversing the seat part or its support. The forces normally occurring in the use position as a result of pressures exerted on the backrest 11 during normal use are accordingly taken up by the stop 19. A catch hook 17 is provided in order to prevent unintentional forward swiveling of the backrest, this catch hook 17 engaging behind the stop 19 at the circumferential region located opposite the projecting region of the articulated part 13. In the construction shown in the drawing, the catch hook 17 is swivelable above the support location of the articulated part 13 about a bearing pin 20 which is fixed thereto. At its upper side, the hook jaw 21 of the catch hook 17 has a control cam 23 which projects beyond the hook finger 22 and engages over the upper side of the stop 19. The back of the catch hook 17 has a pressing face 24 which is arranged above the hook jaw 21 so as to be offset laterally to the bearing pin 20. This pressing face 24 is contacted by the lifting face 26—which is shown most clearly in FIG. 5—of a retaining lever 25 as shown in the blocking position illustrated in FIG. 2. A bearing pin 27 is arranged above the bearing pin 20 at the articulated part 13 so as to be laterally offset relative to the bearing pin 20 and projects toward the same side, the retaining lever 25 being supported on the bearing pin 27 so as to be swivelable. Above the bearing pin 27, the retaining lever 25 has an articulation point 28 for a releasing member 29, e.g., constructed as a Bowden cable, which is connected with the handle 18.

Figure 5:
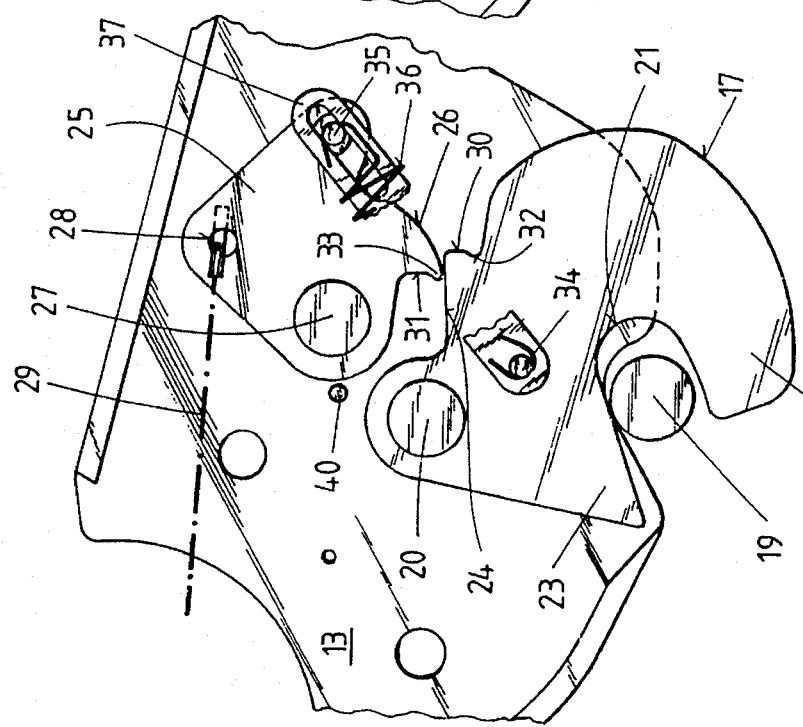
FIG. 5 shows the catch hook arrangement during the disengagement phase of the retaining lever in a view analogous to FIG. 2.
Figure 7:
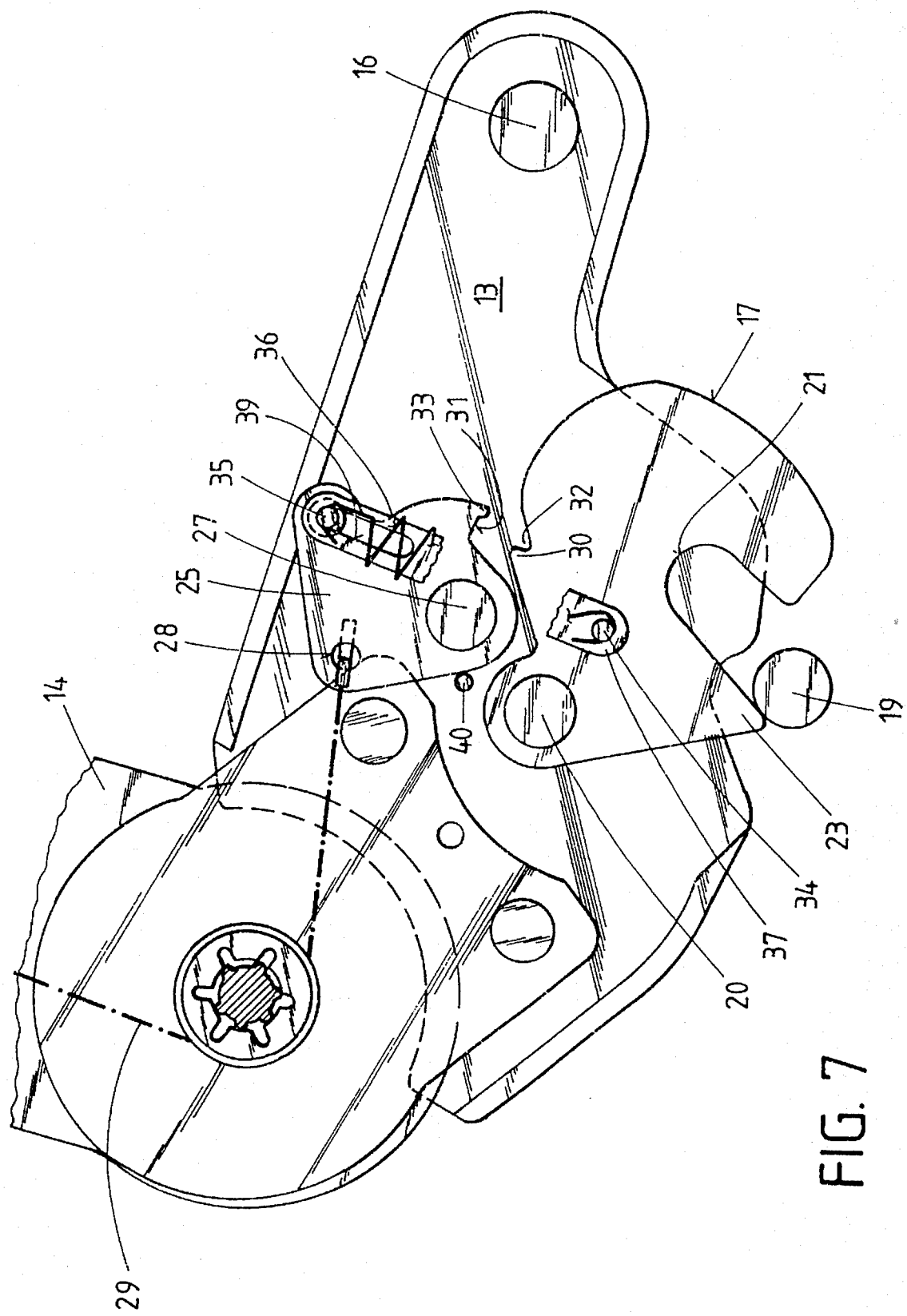
FIG. 7 shows the catch hook arrangement in a position in which the retaining lever has been moved into a stop position by the Bowden cable for complete disengagement of the catch hook.

As can be seen in particular from FIGS. 5 to 7, the contact side of the catch hook 17 having a pressing face 24 is provided with a back-step 30, a projection 31 of the retaining lever 25 engaging behind this back-step 30 in the open position of the catch hook 17. The corner region of the back-step 30 abutting the back of the catch hook 17 is provided with a groove 32 which is set back from the back-step 30. In the open position of the catch hook 17 shown in FIG. 6, a protuberance 33 at the tip formed between the lifting face 26 and the projection 31 of the retaining lever 25 engages in this groove 32. This ensures that the catch hook 17 will remain in its open position until the control cam 23 comes to rest at the stop 19 and exits the secured open position shown in FIG. 6, accompanied by a corresponding loading of the articulated part 13, by means of swiveling the catch hook 17 in the clockwise direction.

An axle pin 34 which is directed toward the inner side of the seat and is connected with the catch hook 17 in a stationary manner emerges from the catch hook 17 in the region between the bearing pin 20 and the hook jaw 21. The retaining lever 25 also has an axle pin 35 which emerges toward the inner side of the seat and is connected with the retaining lever 25 in a stationary manner, e.g., by riveting. The catch hook 17 and retaining lever 25 are connected with one another by a force accumulator 36 via axle pins 34 and 35 so as to press against one another. A tension spring with one end secured to axle pin 34 and the other end secured to axle pin 35 may be used as a force accumulator 36. A safety coupling 37 constructed as a thin-walled flat piece is associated with this tension spring. This safety coupling has a bearing bore hole 38 at one and, e.g., for grasping axle pin 34, and is provided at the other end with an elongated hole 39 which engages over the other axle pin 35 at the retaining lever 25.

In order to show the contacting region between the catch hook 17 and the retaining lever 25, the central region of the tension spring 36 and safety coupling is cut away in FIGS. 5 to 7. The safety coupling 37 is not essential to the perfect functioning of the catch hook arrangement, i.e., moving the catch hook 17 into its disengaged position on the one hand and securing it in the open position on the other hand. The catch hook 17 and retaining lever 25 need simply be pressed against one another via the tension spring 36. When the Bowden cable is actuated for the purpose of disengagement, the retaining lever 25 is swiveled in the counterclockwise direction around the bearing pin 27, wherein the catch hook 17 is also swiveled about the bearing pin 20 in the counterclockwise direction into a disengaged position due to the action of the tension spring 36. The swiveling phase is shown in FIG. 5.

As soon as the disengaged position is reached and the retaining lever 25 is pulled against a stop 40 at the articulated part 13 via the Bowden cable, the retaining lever 25 is swiveled back into the position shown in FIG. 6 by the tension spring when the Bowden cable is released and its projection 31 engages behind the back-step 30 of the catch hook 17. In so doing, the protuberance 33 at the tip of the projection 31 presses into the groove 32 at the back-step 30 of the catch hook 17 and secures the latter in the open position (FIG. 6). When the backrest which has been swiveled forward into this position is then swiveled back into the position shown in FIG. 1, the control cam 23 first contacts the upper side of the stop 19 so that the catch hook 17 swivels in the clockwise direction and, in that it is supported relative to the retaining lever 25 in a deflectable manner by the tension spring, moves out of the open position shown in FIG. 6 and again occupies the retaining position shown in FIG. 2. The catch hook 17 can only be disengaged from this retaining position by actuating the Bowden cable 29. As a result, the articulated part 13 is supported at the stop 19 without play, since the contacting region of the articulated part 13 contacts the stop 19 on the one hand and the catch hook 17 is pressed against the underside of the stop 19 by the lifting face 26 of the retaining lever 25 on the other hand due to the force of the tension spring 36.

In the event of failure of the tension spring 36, it is possible to disengage the catch hook via the safety coupling 37 since the catch hook can be swiveled out of its locking position via the safety coupling as can be seen from FIG. 7. However, it is not possible to hold the catch hook 17 in the open position shown in FIG. 6 if the force accumulator 36 fails, since the gravitational force of the catch hook 17 and retaining lever 25 swivels the latter in the clockwise direction. In this case, therefore, the Bowden cable 29 must be pulled until the catch hook 17 occupies the position shown in FIG. 2 by means of the control cam 23 and the retaining lever 25 is likewise swiveled by gravitational force in the clockwise direction into the position shown in FIG. 2 and contacts the pressing face 24 via its lifting face 26 in the position shown in FIG. 2.

As was already mentioned, the embodiment form shown and described above is given only as an example illustrating the subject of the invention which is in no way limited thereby. Rather, there are many possible modifications and different constructions of the subject of the invention. Further, all features shown in the drawing and mentioned in the description are substantial to the invention, even if not expressly claimed.

What is claimed:

1. A catch hook for the releasable locking of a backrest which is connected with a seat part of a vehicle seat such that it can swivel forward, comprising:

an articulated fitting;

said catch hook being supported in a swivelably articulated manner at an articulated part of said articulated fitting which includes an adjusting and locking arrangement for adjusting the inclination of the backrest;

said articulated part being connected with the seat part so as to be swivelable;

said catch hook having a hook jaw engaging around a stop for the articulated part in the locking position, said stop being fixed to the seat part;

a retaining lever for securing the locking position in a releasable manner, said lever acting on said catch hook and being supported at the articulated part so as to be swivelable;

said catch hook having a control cam forming an upper side of the hook jaw and projecting beyond a finger of said catch hook;

said catch hook being connected with the retaining lever by a force accumulator which acts on said lever so as to press said catch hook and lever against one another;

an operable releasing member being articulated at the retaining lever; and a safety coupling element separate from said force accumulator and connecting said catch hook and said retaining lever to one another.

2. The catch hook according to claim 1, wherein a back-step is arranged on the contacting side of the catch hook located above the hook jaw for contacting the retaining lever, a projection of the retaining lever engaging behind the back-step in an open position of the catch hook wherein said hook jaw is spaced from said stop to allow a swiveling of the backrest relative to the seat part.

3. The catch hook according to claim 2, wherein the corner region of the back-step adjoining the back of the hook has a groove in which a protuberance arranged at the tip of the projection at the retaining lever engages to secure the open position of the catch hook.

4. The catch hook according to claim 1, wherein an axle pin projects from a side of the catch hook, said axle pin being acted upon by one end of the force accumulator which is constructed as a tension spring, while the other end of the force accumulator acts on an axle pin emerging from a side of the retaining lever, wherein the axle pins also serve to receive the safety coupling.

5. The catch hook according to claim 4, wherein the safety coupling has a bearing bore hole for receiving one axle pin, while the other axle pin is engaged by an elongated hole of the safety coupling.

6. An assembly for the releasable locking of a backrest relative to a seat part of a vehicle seat, comprising:

an articulated fitting having an articulated part adapted to be fixed to a seat part;

a stop adapted to be fixed to a seat part;

a catch hook pivotably mounted to said articulated part and having a jaw recess for receiving said stop in a locking position of the assembly;

a retaining lever pivotably mounted to said articulated part for acting on said catch hook to secure the locking position in a releasable manner;

a force accumulator connecting said catch hook and said retaining lever to one another, said force accumulator acting on said retaining lever so as to press said catch hook and said retaining lever against one another;

an operable releasing member being articulated at the retaining lever; and a safety coupling element separate from said force accumulator and connecting said catch hook and said retaining lever to one another separately from said force accumulator.

7. The assembly according to claim 6 wherein a back-step is provided on a side of said catch hook located above said jaw recess for contacting said retaining lever, said retaining lever having a projection engaging behind the back-step in an open position of the catch hook wherein said jaw recess is spaced from said stop to allow a swiveling of the backrest relative to the seat part.

8. The assembly according to claim 7 wherein the backstep has a corner region provided with a groove, said projection having a protuberance engaging in said groove to secure said catch hook in said open position of said catch hook.

9. The assembly according to claim 6 wherein a first axle pin projects from a side of said catch hook and a second axle pin projects from a side of said retaining lever, said force accumulator taking the form of a tension spring connected at opposite ends to said first axle pin and said second axle pin, said safety coupling also being connected at opposite ends to said first axle pin and said second axle pin.

10. The assembly according to claim 9 wherein said safety coupling is provided at one end with a bearing bore hole receiving one of said first axle pin and said second axle pin, said safety coupling being provided at an opposite end with an elongated hole for receiving the other of said first axle pin and said second axle pin.

* * * * *